| United States Patent [19] | [11] Patent Number: 4,918,911 |
| Grau et al. | [45] Date of Patent: Apr. 24, 1990 |

[54] SPINNING APPARATUS

[75] Inventors: Gerhard Grau, Muellheim; Josef Derichs, Moenchengladbach, both of Fed. Rep. of Germany

[73] Assignee: Zinser Textilmaschinen GmbH, Fed. Rep. of Germany

[21] Appl. No.: 281,823

[22] Filed: Dec. 8, 1988

[30] Foreign Application Priority Data

Dec. 8, 1987 [DE] Fed. Rep. of Germany ....... 3741430

[51] Int. Cl.$^5$ .......................... D01H 7/66; D01H 7/50
[52] U.S. Cl. .......................................... 57/100; 57/74; 57/93; 57/95
[58] Field of Search .................. 57/74, 93, 94, 95, 100, 57/127, 264

[56] References Cited

U.S. PATENT DOCUMENTS

| 2,833,111 | 5/1958 | Hadlich | 57/74 |
| 3,785,140 | 1/1974 | Muller | 57/100 |
| 4,437,300 | 3/1984 | Vignon | 57/74 |
| 4,592,196 | 6/1986 | Wolf | 57/74 |

FOREIGN PATENT DOCUMENTS 0225660 11/1986 European Pat. Off. .
1053365 9/1959 Fed. Rep. of Germany .
1943215 3/1971 Fed. Rep. of Germany .
3441585 6/1985 Fed. Rep. of Germany .
3400327 7/1985 Fed. Rep. of Germany .

Primary Examiner—Donald Watkins
Attorney, Agent, or Firm—Shefte, Pinckney & Sawyer

[57] ABSTRACT

A spinning machine has an electric motor for rotating a bobbin-supporting spindle to build a package of yarn thereon and a funnel for guiding yarn onto the spindle. The spindle is rotatingly driven by an electric motor and the electric motors of the spindle and the funnel are commonly connected to a frequency control means which is, in turn, connected to an electrical power supply means. The torque of the funnel electric motor is a function of a characteristic of the funnel in accordance with the relationship that the funnel is rotated by its electric motor at a lower rate relative to the contemporaneous rate of rotation of the spindle. The apparatus can include a switch assembly selectively movable between leads for selectively connecting the funnel electric motor to the frequency control apparatus to operate the motor or to the electrical power supply means to brake the motor.

17 Claims, 2 Drawing Sheets

SPINNING APPARATUS

BACKGROUND OF THE INVENTION

The present invention relates to an apparatus for use with a spindle of a textile spinning machine and a funnel associated with the spindle. More particularly, the present invention relates to an apparatus for controlling the respective rotational speeds of the spindle and the funnel.

It has been proposed, for example, in German Patent No. A 34 00 327, to provide a separate drive motor to rotate the yarn guide funnel associated with a particular spindle and especially in situations in which the yarn being guided by the funnel to the spindle is relatively fine and not capable of sustaining relatively significant axial tensions without breakage. The funnel is rotated at a speed relative to the rotational speed of the spindle such that the additional rotational force exerted by the yarn traveling from the funnel onto the package being formed on the spindle need only be a relatively small force to bring the rotational speed of the funnel to the rotational speed for winding the yarn onto the spindle. Typically, the rotational speed of the funnel is less than that of the spindle and is less than a predetermined range of rotational speeds, since the rotational speed of the funnel is a function of the varying diameter of the package being formed on the spindle.

In the spinning process, the winding conditions and especially the moment forces on the yarn being wound on the package vary during winding at a constant rate of rotation of the spindle. This is so because the cross sectional diameter of the package being formed on the rotating spindle varies during the winding process. During a period of winding when the cross sectional diameter of the package is relatively large, the funnel must rotate correspondingly faster to constantly deliver the yarn therefrom onto the package as compared to a winding period when the cross sectional diameter of the package is relatively small. During the period of time at which the cross sectional diameter of the package changes from a relatively large value to smaller and smaller values, the danger exists that the funnel, on account of its inertia, will rotate at a rate relative to the rotation of the spindle which is too high, thereby leading to an undesirably low tension in the yarn traveling from the funnel onto the package.

German Patent No. A 34 00 327 also discloses a braking apparatus for applying a constant braking action to the funnel to minimize the influence of the movement of the funnel due to its inertia; this leads to an increased level of complexity and, under certain conditions, to a significant variation in the tension of the yarn.

SUMMARY OF THE INVENTION

The present invention provides an apparatus which rotates the funnel and the spindle of the spinning machine at desired rates of rotation with a relatively minor amount of control equipment and also provides a controlled braking of rotation of the funnel to maintain substantial uniformity of tension in the yarn being wound.

Briefly described, the present invention provides, in a spinning machine having an electric motor for rotating a bobbin-supporting spindle to build a package of yarn thereon and a funnel for guiding yarn onto the spindle, an apparatus including an electric motor for rotating the funnel, means for supplying electrical power, means, connected to the electrical power supplying means, for controlling the frequency of the electrical power supply and means for commonly connecting the electric motors to the frequency controlling means, whereby both electrical motors are supplied with power at the same frequency, and the torque of the funnel electric motor is a function of a characteristic of the funnel in accordance with the relationship that the funnel rotated by the funnel electric motor is at a lower rate relative to the contemporaneous rate of rotation of the spindle. Preferably, the apparatus further includes means for controlling the torque of the funnel electric motor in response to the building of the yarn on the spindle.

According to another aspect of the present invention, an apparatus is provided, in a spinning machine having a funnel for guiding yarn onto a spindle to form a package thereon, the funnel being rotated relative to the spindle, with means for braking the rotation of the funnel and means connected to the braking means for controlling the braking of the rotation of the funnel in response to predetermined winding conditions.

To control the winding conditions and, especially to control the yarn tension variations to a uniform amount, the funnel can be provided with a periodically actuable braking apparatus. Through such a periodically actuable braking apparatus, the influence of the inertia of the funnel during the period in which the cross sectional diameter of the package changes from a relatively large value to smaller values, can be reduced or virtually completely eliminated. Suitable braking apparatus would include practically all known braking apparatus in so far as they are selectively operable and have adjustable braking effects and would include, for example, electrical, magnetic, mechanical, or pneumatic braking apparatus. To reduce or smooth out the most extreme tension values occurring in the yarn, the braking apparatus can be correspondingly operated in a phase delayed manner.

DETAILED DESCRIPTION OF THE PREFERRED EMBODIMENTS

Figure 1:
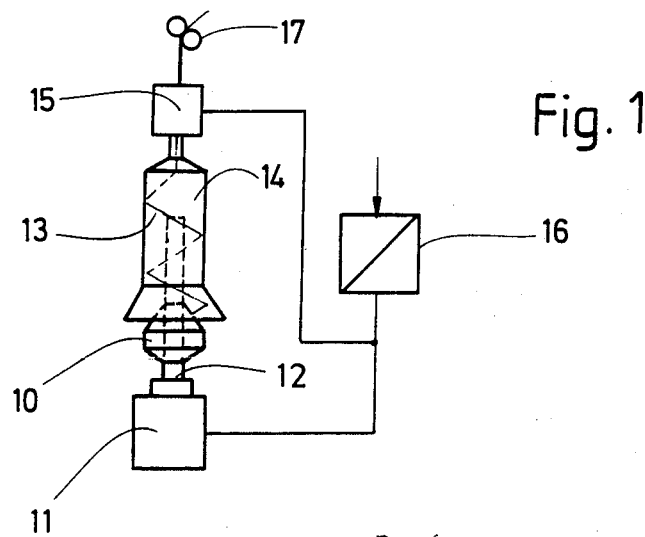
FIG. 1 is a schematic representation of one preferred embodiment of the apparatus of the present invention including a spindle of a spinning machine and its associated funnel, showing the individual motors of the spindle and the funnel connected to a common power source.

In FIG. 1, one preferred embodiment of the apparatus of the present invention installed in a spinning station of a spinning machine is illustrated and includes a spindle 12 rotatably driven by a motor 11 for winding a package 10 thereon, and a funnel 14 associated with the spindle 12 for guiding yarn 13 thereto. A drafting apparatus 17 of the spinning machine feeds yarn along a path to the funnel 14. The funnel 14 is rotatably driven by a motor 15 with the motor 11 for the spindle 12 and the motor 15 connected to a common frequency supply source 16. The motors 11 and 15 are asynchronous motors.

The funnel 14 includes a channel coaxial with the spindle 12 in which the yarn 13 is received from the drafting apparatus 17 and guided inside the funnel and an opening through which the yarn 13 travels from the inside of the funnel to the outside of the funnel where it moves in a spiral-like pattern about the funnel as it is wound onto the spindle 12. In conventional manner, either the funnel 14 or the spindle 12 is moved axially up and down in correspondence with the up and down movement of the ring banks of the spinning machine.

Figure 2:
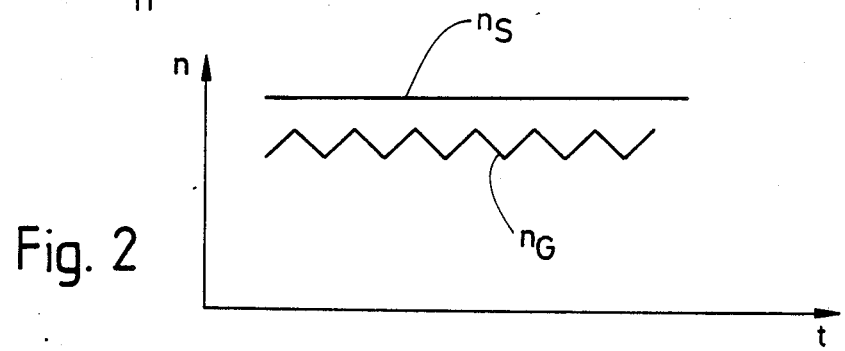
FIG. 2 is a graphical representation of the rotational speeds of the spindle and the funnel with the rotational speeds being plotted on the abscissa and the time plotted on the ordinate.

In FIG. 2, a graphical representation of the rotational speeds of the spindle and funnel is illustrated with the rotational speed as the abscissa and the time of rotation as the ordinate. The spindle 12 rotates at a constant speed of rotation $n_S$ and the funnel 14 rotates at a rotational speed $n_G$ which is less than the rotational speed $n_S$ of the spindle 12. Since the rotational speed of the funnel 14 varies in response to the changes in the diameter of the package 10 being wound on the spindle 12, the rotational speed of the funnel 14 increases and decreases between a minimum speed of rotation and a maximum speed of rotation in a uniform manner.

The common frequency supply source 16 supplies the motors 11,15 with the same frequency. It is also contemplated that the common frequency supply source 16 can also control the operation of other individual motors at other spinning stations as well.

Figure 3:
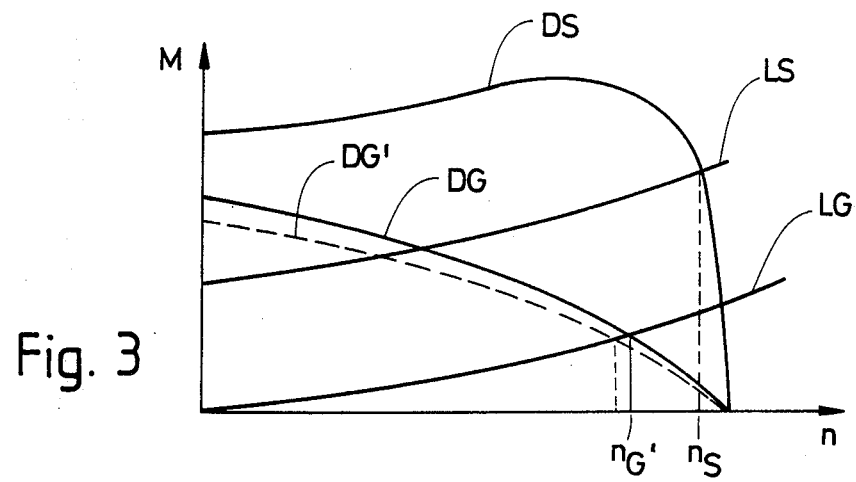
FIG. 3 is a graphical representation of the torque characteristics of the spindle and the funnel and the load-moment characteristics of the spindle and the funnel with the moment force being plotted on the abscissa and the rotational speed being plotted on the ordinate.

In FIG. 3, the torque characteristics and load characteristics of the funnel 14 and the spindle 12 are illustrated with the torque plotted on the abscissa and the speed of rotation plotted on the ordinate. The plot DS represents the torque of the spindle motor 11. The plot LS represents the load characteristic of the spindle 12. The intersection of plot DS and the plot LS determines the rate of rotation $n_S$ of the spindle 12. The plot DG represents the torque of the motor 15 which drives the funnel 14 and the relatively constant slope of the plot DG indicates that the torque is a "soft" torque. The motors 11,15 have the same synchronized rate of speed. The intersection of the load characteristic plot LG of the funnel 14 with the torque plot DG of the funnel determines the rate $n_G$ at which the motor 15 rotates the funnel 14. However, the actual rate of rotation $n_G$ of the funnel 14 is somewhat higher than the driven rate of rotation $n_{G'}$ since the yarn 13 traveling onto the package 10 adds an additional rotational force to the funnel 14. By using a motor, such as the motor 15, whose torque conforms to the plot DG, it is possible to supply the motors 11,15 with the same power frequency and still achieve differing rates of rotation of the spindle 12 and the funnel 14.

In another embodiment of the present invention, the rate of rotation of the funnel 14 can be controlled so that the yarn 13 is wound onto the package 10 with substantially the same tension, without changing the synchronous rate of rotation thereof. This can be accomplished, for example, by installing one or several resistors in the circuit of the motor 15 which are activated in response to the axial movement of the funnel 14 or the spindle 12. By controlled activation of these resistors, the torque of the motor 15 can be controlled to be in the range of values, the graphical representation of which is between the plot DG and the plot DG' shown in FIG. 3.

Figure 4:
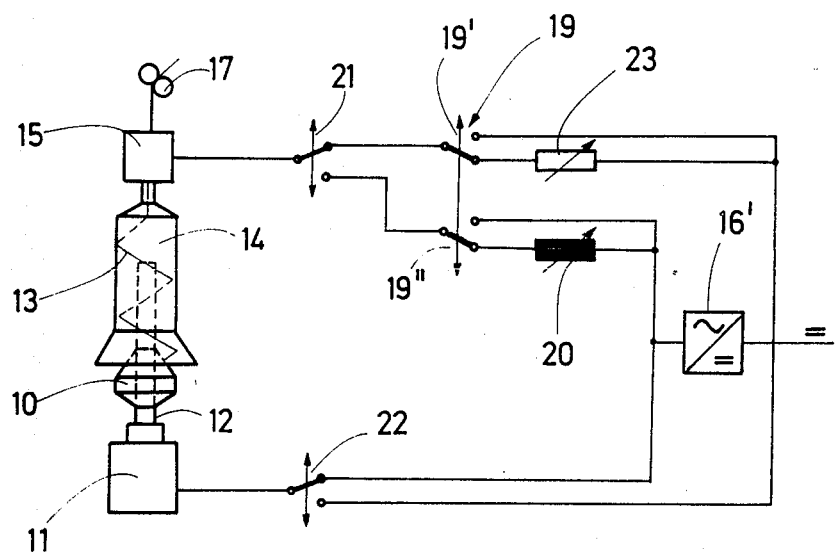
FIG. 4 is a schematic representation of the spindle and funnel apparatus shown in FIG. 1 and also showing a control apparatus for the individual motors of the spindle and the funnel.

In FIG. 4, another embodiment of the present invention is illustrated and includes a spindle 12 rotated by an electric motor 11 and a funnel 14 rotated by an electric motor 15. A supply of yarn 13 is delivered to the funnel 14 via a pair of delivery rollers 17 and the funnel 14 is rotated relative to the rotating spindle 12 as the yarn 13 travels over the surface of the funnel 14 to form a package 10 on the spindle 12. Each electric motor 11,15 is connected to a frequency control apparatus 16' as well as a direct current power source (not shown). The frequency control apparatus 16' receives current from the direct current power source and controls the current frequency. The connection of the electric motor 15 to the frequency control apparatus 16' and the direct current power source includes a switch 21 which switches between two parallel leads each respectively connecting to the frequency control apparatus 16' or the direct current power source. Each lead includes a pair of sub-leads. A switch mechanism 19 has a pair of switch elements 19' and 19" which each are operable in a respective one of the branch lines connecting the electric motor 15 to the frequency control apparatus 16' and to the direct current power source. The switch elements 19' and 19" are connected together for synchronized movement whereby both can be moved simultaneously to connect with one of a pair of sub-leads in each lead. One sub-lead from one of the parallel leads connect the motor 15 and the direct current power source through a variable resistor coil 23. One of the other sub-leads from the other of the parallel leads includes a variable resistor coil 20.

Through the supply of direct current from the direct current power source to the electric motor 15, the motor can be braked. If the switch 21 connects the motor 15 to the direct current lead and the switch element 19' connects the lead to the resistor coil 23, the direct current supply by the direct current power source is impeded and a smoother braking action is achieved. Likewise, the switch 21 can be actuated to connect the electric motor 15 with the frequency control apparatus lead so that the current supplied to the electric motor 15 is controlled by the frequency control apparatus 16'. Additionally, if the switch element 19" is connected to the lead having the resistor coil 20 therein, the current supply to the electric motor 15 will be impeded and a smoother operation of the electric motor 15 will be achieved.

The operation of the switches 19,21 and 22 during the winding operation are as follows. To actuate the motors 11,15, their respective switches 21,22 are actuated to connect the motors with the frequency control apparatus 16'. Additionally, to conform the torque characteristics of the electric motor 15 with a predetermined "soft" torque-rotation characteristic, the switch mechanism 19 is actuated to move its element 19" to connect the electric motor 15 with the sub-lead having the resistor coil 20 therein. In accordance with the present invention, the frequency control apparatus 16' assures that the motors 11,15 are supplied with current of the same frequency and the torque characteristics of the electric motor 15 are such that the rate of rotation of the funnel 14 relative to the rate of rotation of spindle 12 follows a predetermined relationship and, preferably, a relationship whereby the funnel 14 rotates at a rate less than the rate of rotation of spindle 12. During the course of the winding of the package 10 on the spindle 12, the rate of rotation of the spindle 12 can be braked by actuating the switch 22 to connect the electric motor 11 with the direct current power source. Similarly, the rate of rotation of the funnel 14 can be braked by actuating the switch 21 and the switch 19 to connect the electric motor 15 directly with the direct current power source. If the switch element 19' is connected to the sub-lead having the resistor coil 23, a "soft" braking of the electric motor 15 will result. The braking operation of the electric motor 15 is implemented when the diameter of the package 10 decreases after reaching its greatest diameter since the moment of the yarn 13 being wound on the package decreases and the corresponding rate of rotation of the funnel 14 must also decrease to maintain the desired yarn tension. Once the smallest diameter of the package 10 has been reached and the moment of the yarn 13 begins to increase again, the rate of rotation of the funnel 14 is increased by operating the electric motor 15 in conformance with the desired "soft" torque-rate of rotation characteristic.

During the spinning operation, the switches 19 and 22 are positioned in the positions illustrated in FIG. 4 and switch 21 alternates between its two positions. The motors 11,15 are supplied with a predetermined frequency from the frequency control apparatus 16'. The switch element 19" is connected to the sub-lead having the resistor coil 20 so that the motor 15 of the funnel 14 exhibits a "soft" torque-rotation characteristic.

The switching of the switch 21 between its two positions can be accomplished, for example, in response to the axial movement of the funnel 14 or the spindle 12, which axial movement determines the diameter of the package 10 and, therefore, the winding moment. In actuality, the switching of the switch 21 between its two positions is accomplished in a phase-delay fashion with respect to the actual diameter of the package 10 so that the peak tension forces on the yarn 13 are somewhat reduced.

To achieve the fastest possible operation of the funnel 14 at the beginning of the spinning operation, the switch element 19" is switched to the sub-lead that does not include the resistor coil 20 so that a correspondingly "steep" or "hard" torque-rotation characteristic is produced in the motor 15. To achieve the fastest possible braking of the motor 15 such as, for example, at the end of the spinning operation, the switch element 19' is switched to the sub-lead that does not include the resistor coil 23.

The resistor coil 20 and the resistor coil 23 are adjustable to a predetermined value. In a modification of the embodiment illustrated in FIG. 4, the resistor coil 20 and/or the resistor coil 23 are provided with adjustment elements so that, during the rotation and/or braking of the funnel, the torque and/or the braking moments can be varied with respect to the rate of speed. The plot of the rate of rotation values $n_G$ of the motor 15 is only schematically represented in FIG. 2. In actuality, the rate of rotation $n_G$ does not vary in such a uniform manner between the maximum and minimum values so that the most comprehensive control of the corresponding adjustment by the resistor coil 20,23 can be accomplished.

During the spinning of yarn having adequate tensile or braking strength, it is not necessary in most instances to rotatably drive the funnel 14. The strength of the yarn 13 in such instances is sufficient to rotate the funnel 14 as the yarn is wound onto the package, even at high rotational speeds. However, in these circumstances, it is often necessary to brake the funnel to a low rotational speed in correspondence with the change of the winding moment so that the funnel does not rotate too much, relative to the spindle, on account of its momentum, in which instance the tension of the yarn 13 unwinding therefrom is too severely reduced. Accordingly, in such circumstances, the funnel 14 can be braked with a braking mechanism such as, for example, the electric braking circuit of FIG. 4 connected to the motor 15. This braking apparatus can be adjusted to provide a corresponding "soft" braking effect. Additionally, it is possible to not only periodically operate the electric braking mechanism but also to operate the braking mechanism in response to the non-linear speed characteristics of the funnel. Instead of the electric braking mechanism, it is contemplated that a mechanical, pneumatic or other known braking apparatus can be used which can be correspondingly periodically operated and the output of which can be metered. Also, in such circumstances, it is advantageous if a predetermined phase delay is provided so that the peak tension forces are avoided.

In another modification of the preferred embodiment of the present invention, a synchronous motor can be used for the motor 11 which drives the spindle 12 so that there is already a built-in difference between the rotational speed of the spindle 12 and the funnel 14 due to the slippage of the asynchronous motor 15 and this difference between the relative rotational speeds of the funnel and the spindle can be further developed by the application of a "soft" torque corresponding to the plot DG in accordance with the present invention.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. In a spinning machine having an electric motor for rotating a bobbin-supporting spindle to build a package of yarn thereon and a funnel for guiding yarn onto the spindle, an apparatus comprising:

an electric motor for rotating the funnel;

means for supplying electrical power;

means, connected to the electrical power supplying means, for controlling the frequency to the electrical power supply;

means for commonly connecting the electric motors to the frequency controlling means, whereby both electrical motors are supplied with electrical power of the same frequency; and said funnel electric motor having a torque characteristics for rotation of the funnel at a lower rate relative to the contemporaneous rate of rotation of the spindle.

2. In a spinning machine, an apparatus according to claim 1 and characterized further by means for controlling the torque of the funnel electric motor in response to the building of the yarn on the spindle.

3. In a spinning machine, an apparatus according to claims 1 or 2 and characterized further in that the means for commonly connecting the electric motors to the frequency controlling means includes a lead connected to the funnel electric motor, a first sub-lead connected directly to the frequency controlling means, a sub-lead having means for resisting the flow of current therethrough connected to the frequency controlling means and first switch means selelctively operable to connect the funnel electric motor lead to said sub-leads alternatively.

4. In a spinning machine, an apparatus according to claim 3 characterized further by a lead connected to the spindle electric motor, a first lead connected to the electric power supply means, a second lead connected to the electric power supply means, a second sub-lead connected directly to the frequency controlling means, a first switch means for selectively coupling the leads connected to the funnel electric motor with the first electric power supply means lead or the first movable means alternatively and a second switch means for selectively connecting the spindle electric motor lead with the second sub-lead or the second electric power supply means lead alternatively, whereby the funnel and spindle electric motors can be braked selectively by connecting their respective motors directly to the electric power supply means.

5. In a spinning machine, an apparatus according to claim 4 and characterized further by a selectively actuable braking means for directly braking the funnel to brake its rotation.

6. In a spinning machine, an apparatus according to claim 5 and characterized further in that the braking force applied by the braking means is variable.

7. In a spinning machine, an apparatus according to claim 6 and characterized further in that the braking means is actuable in response to the conditions during the building of the yarn package and the braking force applied by the braking means is variable in response to conditions during building of the yarn package.

8. In a spinning machine, an apparatus according to claim 7 and characterized further in that the braking means is actuable in response to the yarn tension and the braking force applied by the braking means is variable in response to the yarn tension.

9. In a spinning machine, an apparatus according to claim 8 and characterized further in that the braking means is controllable to conform to a plot of predetermined yarn tension values.

10. In a spinning machine, an apparatus according to claim 8 and characterized further by means for sensing the yarn tension and means for controlling the braking means in response to the sensed yarn tension.

11. In a spinning machine, an apparatus according to claim 4 and characterized further by a third lead connected to the electrical power supply means, the third lead including means for resisting the passage of current therethrough and means for selectively connecting the first electrical power supply means lead or the third electrical power supply means lead to the first switch means.

12. In a spinning machine having a funnel for guiding yarn onto a spindle to form a package thereon, the funnel being rotated relative to the spindle, an apparatus comprising:
    means for braking the rotation of the funnel; and
    means, connected to said braking means, for controlling the braking of the rotation of the funnel in response to predetermined winding conditions.

13. In a spinning machine having a funnel for guiding yarn onto a spindle to form a package thereon according to claim 12 and characterized further in that said braking control means brakes the funnel in response to changes in the diameter of the package being wound.

14. In a spinning machine, an apparatus according to claims 12 or 13 and characterized further in that the braking force applied by the braking means is variable.

15. In a spinning machine, an apparatus according to claim 12 and characterized further in that the braking force applied by the braking apparatus is controllable in response to the yarn tension.

16. In a spinning machine, an apparatus according to claim 15 and characterized further in that the braking means is operated to conform to a plot of predetermined yarn tension values.

17. In a spinning machine, an apparatus according to claim 15 and characterized further by means for sensing the yarn tension and means for controlling the operation of the braking means in response to the sensed yarn tension.

* * * * *